United States Patent [19]

Goetzelman

[11] Patent Number: 4,934,722

[45] Date of Patent: Jun. 19, 1990

[54] FOLDING WHEELCHAIR

[76] Inventor: Elmer L. Goetzelman, 44733 Andale, Lancaster, Calif. 93535

[21] Appl. No.: 388,976

[22] Filed: Aug. 3, 1989

[51] Int. Cl.[5] .............................................. B62B 11/00

[52] U.S. Cl. ................................. 280/250.1; 280/642; 280/650; 297/DIG. 4

[58] Field of Search ...................... 280/350.1, 647, 650, 280/657, 42, 304.1; 297/DIG. 4, 42, 44

[56] References Cited

U.S. PATENT DOCUMENTS 4,326,732 4/1982 Gall et al. .................... 280/250.1 X 4,805,931 2/1989 Slasor ........................... 280/250.1 X

*Primary Examiner*—Charles A. Marmor

*Assistant Examiner*—Alan M. Kagen

*Attorney, Agent, or Firm*—Harlan P. Huebner

[57] ABSTRACT

A folding wheelchair that employs a pair of side frames, a rear wheel associated with each frame and a forward caster wheel associated with each frame, a pivotable back with a releasable lock to retain the chair in an open usable position or foldable nonusable position, a wheel shifting plate and link apparatus to effect a folding of the chair to a non-use width as well as allowing the wheels to shift and encompass the frames therebetween within the diameter of the wheels.

12 Claims, 4 Drawing Sheets

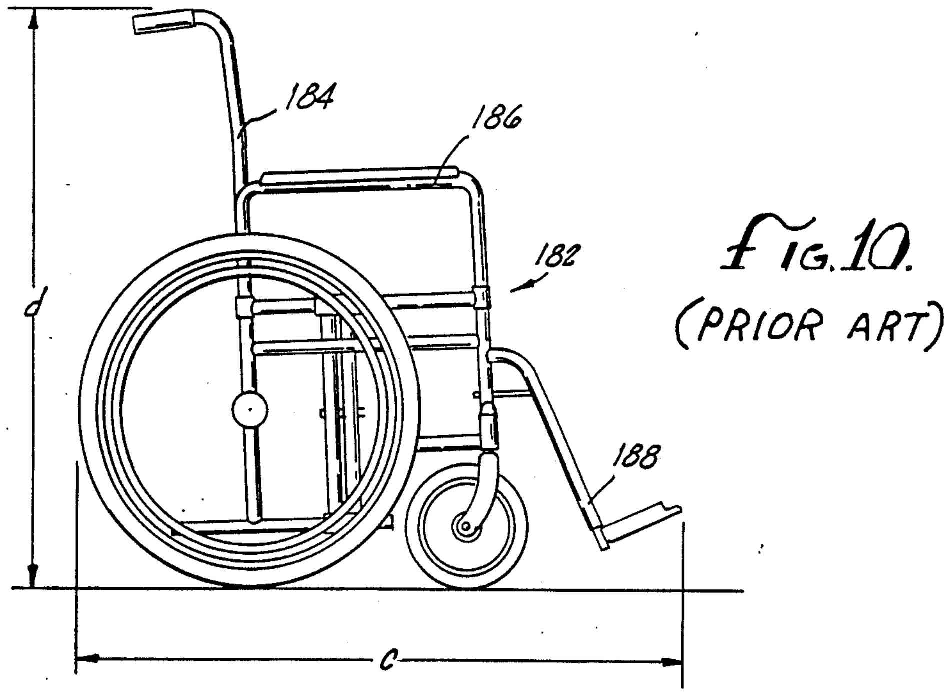
FIG. 10.
(PRIOR ART)
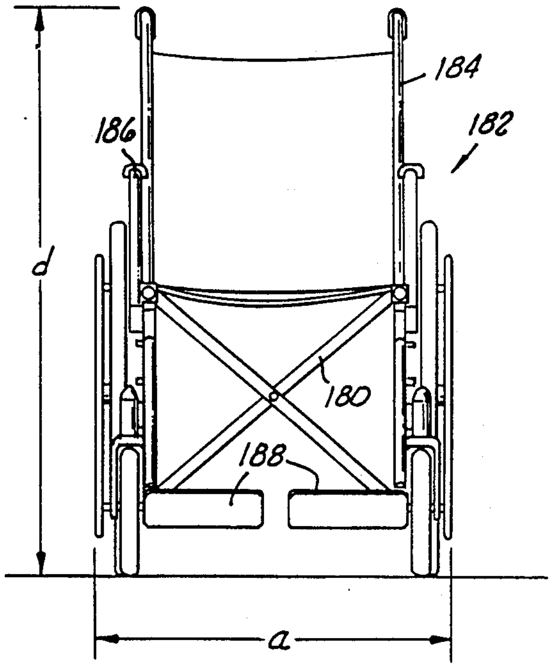
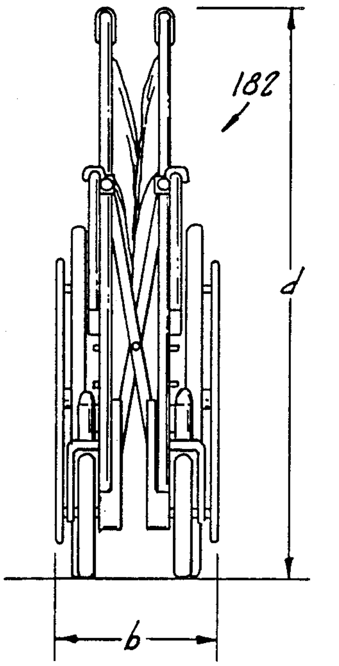
FIG. 11.
(PRIOR ART)
FIG. 12.
(PRIOR ART)

FOLDING WHEELCHAIR

BACKGROUND OF THE INVENTION

1. Field of the Invention

This invention relates to a wheelchair and more particularly to a wheelchair of such a construction that upon folding it becomes compact in both width and perimeter dimension.

2. Description of the Prior Art

Wheelchairs that are capable of adjustments have been available for many years. One of the first patents on such a chair issued in 1894 to Potter as U.S. Pat. No. 531,330. Subsequent to that folding wheelchairs became available to allow them to be placed in vehicles for transportation. An early such chair was illustrated and claimed in U.S. Pat. No. 2,095,411, issued Oct. 12, 1937 to Everest and Jennings.

The Everest and Jennings chair includes two side frames of tubular metal joined together by an X frame that includes a pivot point where the frame members cross. By pushing one side toward the other the chair could fold presenting a reduced width over the open extended width.

To this day the wheelchairs that fold, for convenience, all employ the X frame and some form of locking means to hold the chair open.

While the reduced width has been helpful, with the advent of smaller vehicles and the transportation of wheelchairs on aircraft the need for even further compactness has arising.

Further, the conventional wheelchair does not allow for the folding of the chair back and/or arms which again would increase the perimeter to such as the height of the folded chair. This can also affect its transportation in small vehicles with reduced interior height.

Up until the present there has not been a wheelchair capable of compact folding with a perimeter no greater than the diameter of the larger pair of wheels secured to the wheelchair.

SUMMARY OF THE INVENTION

It is a purpose of the present invention to provide a wheelchair including a set of large rear wheels, a set of front smaller wheels or casters and a frame therebetween that is capable of folding wherein the frame is shifted and contained with the perimeter of the larger wheels and the folded width is relatively small.

Another object of the present invention is to provide a folding wheelchair that includes a pivoted back rest portion.

A still further object is to provide a folding wheelchair that includes folding arms to add to the compactness when the chair is folded.

A further object is to provide a folding wheelchair that includes a frame member that employs a combination of a pivot and slide between the exterior frames that when activated allows one frame to fold toward the other as well as shifting the frames within the perimeter of the larger wheels of the chair.

Another object of the present invention is to provide a wheelchair that has an adjustment feature to raise or lower the seat portion of the chair.

A yet another object of the present invention is to provide a wheelchair that is capable of receiving removable foot and/or leg rests.

A further object of the present invention is to provide a wheelchair that has locking means to maintain the chair in an open usable position or in the folded storage position.

These and other objects and advantages will become apparent from the following part of the specification wherein details have been described for the competence of disclosure, without intending to limit the scope of the invention which is setforth in the appended claims.

BRIEF DESCRIPTION OF THE DRAWINGS

The advantages may be more clearly understood from the following detailed description and by reference to the drawings in which:

FIG. 10 is a side elevational view of a conventional wheelchair;

FIG. 11 is a front elevational view of the chair of FIG. 10; and

FIG. 12 is a front elevational view similar to FIG. 11 with the conventional wheelchair in its folded position.

DETAILED DESCRIPTION OF THE PREFERRED EMBODIMENT

Figure 1:
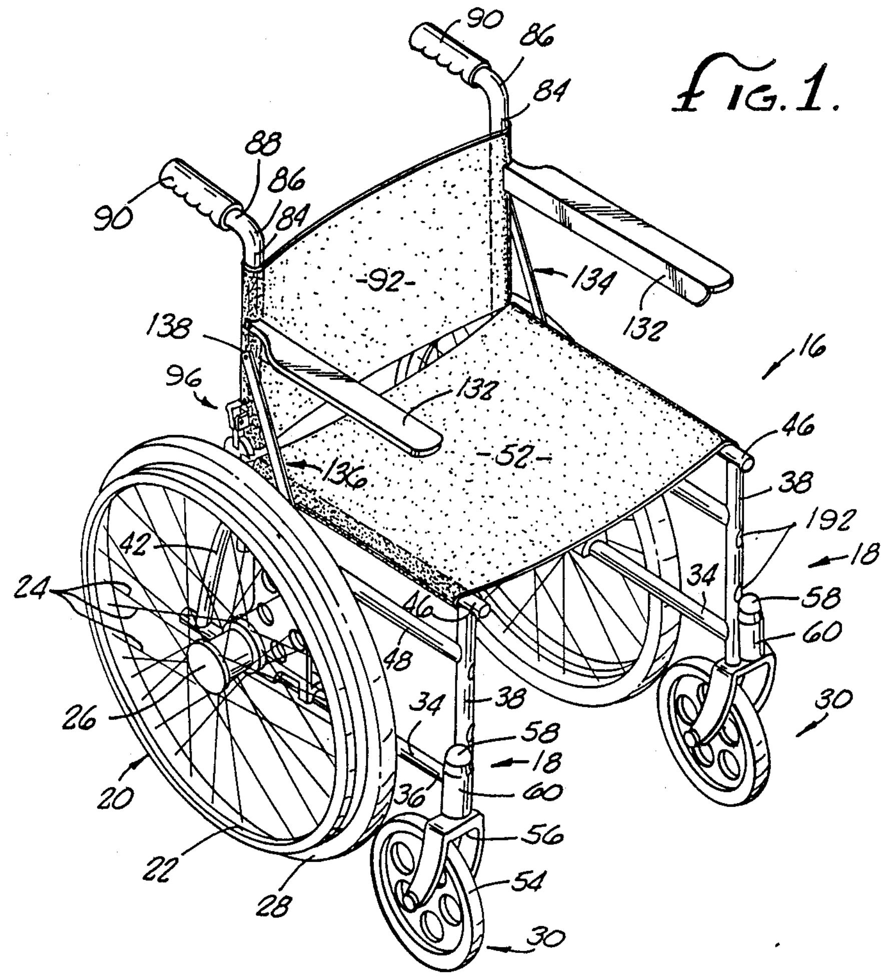
FIG. 1, is a perspective view of the folding wheelchair of the present invention.

In FIG. 1 there is illustrated a folding wheelchair generally designated 16. The wheelchair 16 includes a pair of side frames each generally designated 18 which are preferably formed from metallic tubular stock and each is of the same construction. Therefore, the description of elements of one side frame will be the same for the opposite frame 18.

Secured to the frames 18 on the exterior thereof are a pair of large rear wheels generally designated 20. The conventional wheels 20 each preferably include a wheel rim 22 with spokes 24 radiating to the rim 22 from an axle 26. Preferably secured on the rim 22 is a tire 28. While not forming a part of the present invention the rim 22 may also include a hand rim to be used by the person in the chair 16 to propel the chair.

At the front of the chair 16 are a pair of caster front wheels generally designated 30. Each front wheel 30 is attached to one of the side frames 18 to be described.

Turning now to details of the side frames 18 each frame includes a bottom generally horizontal tubular strut 34. Projecting upwardly from the front end 36 of strut 34 is a front vertical tubular strut 38.

Adjacent the rear end 40 of the horizontal tubular strut 34 there is secured a rear vertical tubular strut 42 which is preferably curved, see FIGS. 1, 4, 5 and 9 terminating in an upper vertical extension 44.

Extending between the strut 38 and upper vertical extension 44 is an upper horizontal seat strut 46.

Below the seat strut 46 there is affixed a horizontal guide rod 48 that also extends between the strut 38 and extension 44. The purpose of rod 48 will subsequently be explained.

Stretching between the upper horizontal seat struts 46, see FIG. 1, is a seat 52 of any conventional pliable and foldable material. The seat 52 may be affixed along each of the struts 46 by any conventional means such as screws (not shown). In addition, the seat 52 may be padded without departing from the spirit of the invention.

Figure 4:
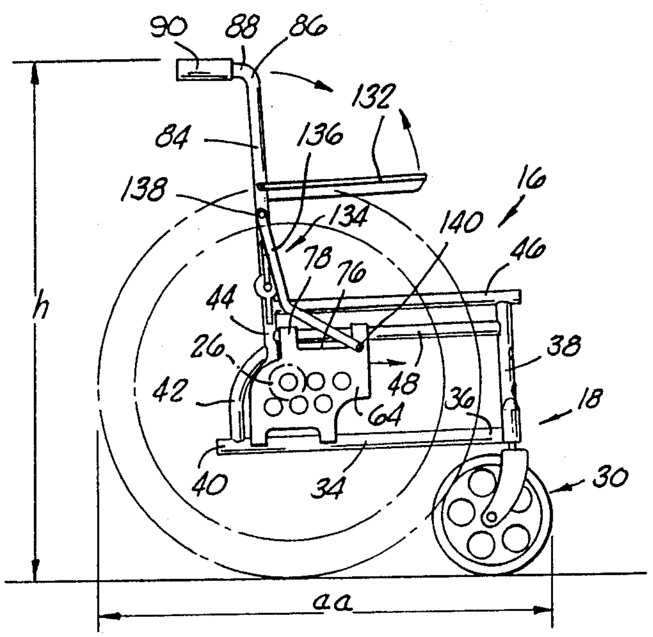
FIG. 4 is a side elevational view of the wheelchair of the present invention in its open and usable position.
Figure 5:
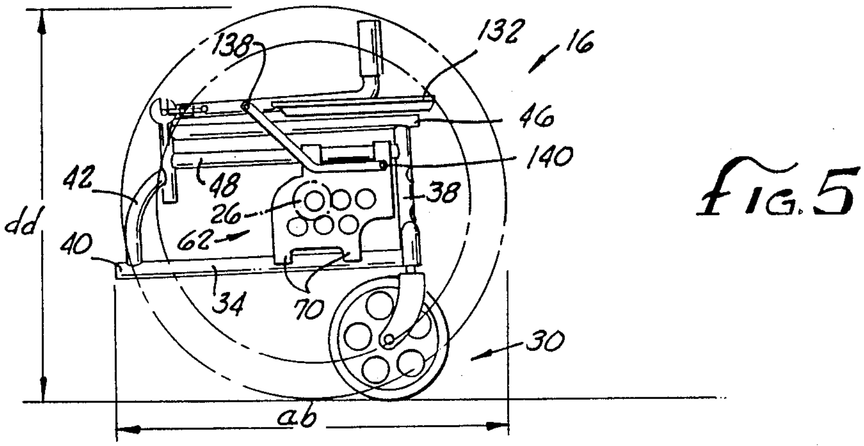
FIG. 5 is a side elevational view of the wheelchair, similar to FIG. 4, but in its folded position.

As can be seen in FIGS. 1, 4 and 5 the front caster wheels 30 are secured to the struts 38. The wheels 30 each include a wheel 54 of any conventional type that is mounted in a wheel yoke 56 which in turn is secured to a swivel axle 58 which is rotatable secured with a swivel collar 60 which is welded or otherwise secured to the strut 38.

The diameter of the wheels 54 is preferably a 1:3 ratio with the diameter of the rear wheels 20. Thus with a rear wheel of a diameter of approximately twenty four inches, then the diameter of the caster wheel would be approximately eight inches in diameter.

Next to be described is a wheel shiftable means generally designated 62 that will allow the wheels 20 to shift forward to overlie the side frames 18 in there entirety which will subsequently be discussed.

The rear wheels 20 have their axles 26 each mounted on an axle plate 64 of the shiftable means 62. The axle plate 64 may have a plurality of axle openings 66 arranged thereon. These openings 66 will allow the wheelchair 16 to have the seat 52 raised or lowered or allow the wheels 20 to be shifted laterally for balancing. The axle 26 by any conventional means may have a portion that passes through one of the openings and is locked therein.

Figure 9:
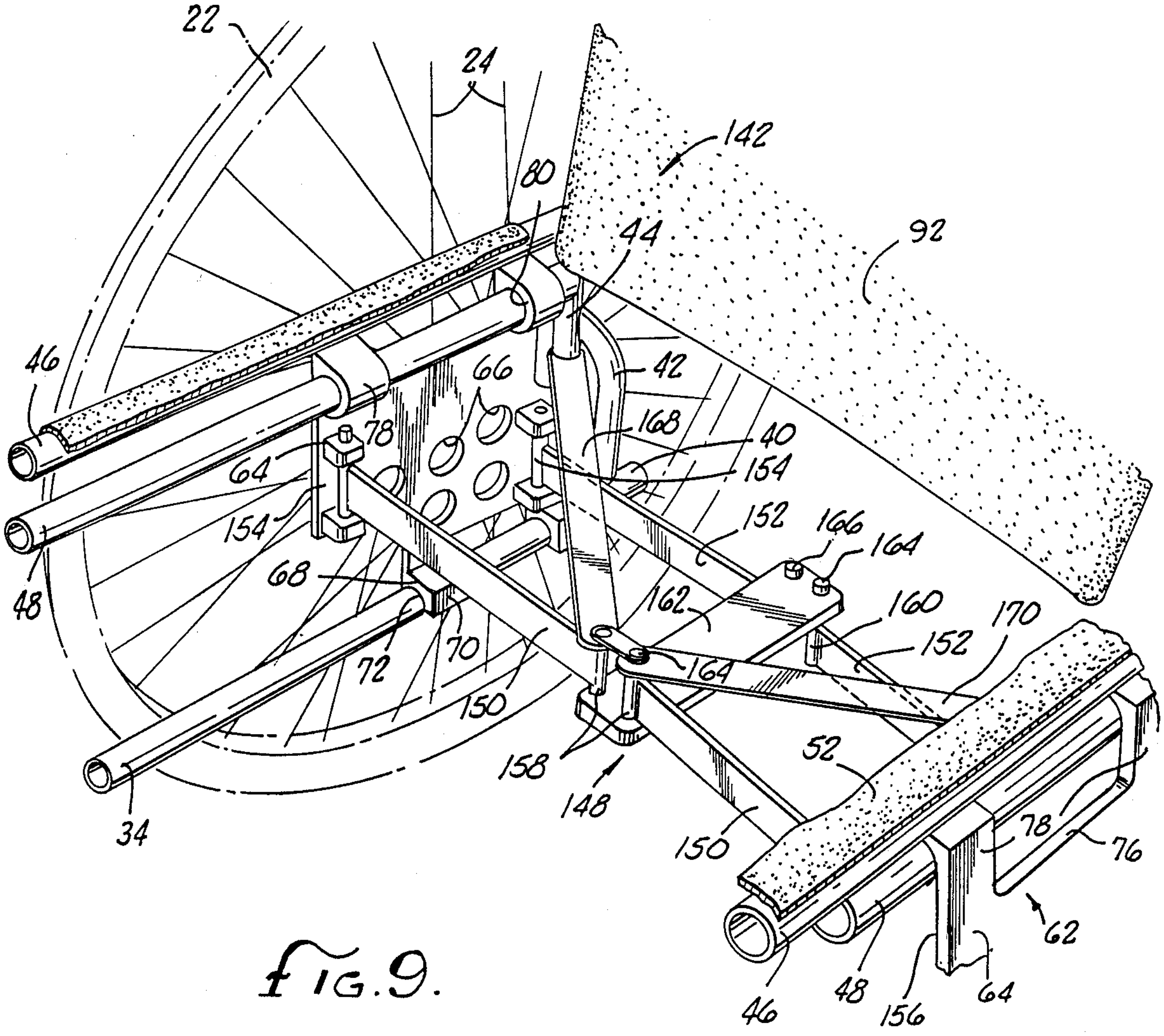
FIG. 9 is an enlarged perspective view of the folding sliding mechanism to cause the wheelchair to fold and retract to optimum compactness.

As best seen in FIGS. 4, 5 and 9 the axle plates 64 are slidable on the strut 34 and 48 as follows. Projecting downward from the plate 64 is a slide bracket 68 that include one or more slide blocks 70 each having an arcuate concave surface 72 that corresponds to a portion of the circumference of the tubular strut 34.

At the upper end 76 of the plate 64 (see FIG. 9) there are preferably a pair of attachment brackets 78 that project from the plate 64 and are slidably mounted on guide rod 48 through bores 80. Thus, the plate 64 through the brackets 78 and slide blocks 70 will allow the frames 18 to slide from a rear open position FIG. 4 to a forward closed position FIG. 5.

Now referring to FIGS. 1, 4 and 5 there is projecting upwardly from the vertical extensions 44 of the rear vertical strut 42 a tubular back frame elements 84 which are bent at 86 to form handle portion 88. As can be seen in FIG. 1 hand grips 90 may be placed on the handle portions 88 to push the wheelchair 16.

Extending between the back frame elements 84 is a conventional back 92 of material similar to the seat 52.

Figure 6:
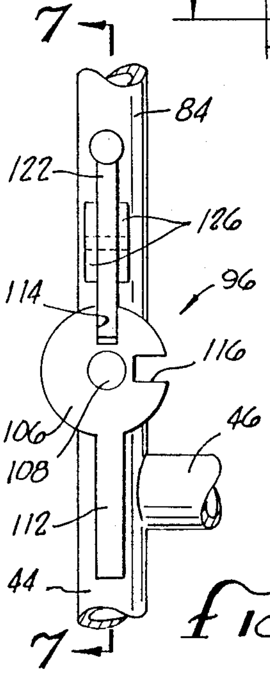
FIGS. 6, 7 and 8 are detailed views of the locking mechanism to maintain the chair in an open or folded position.
Figure 7:
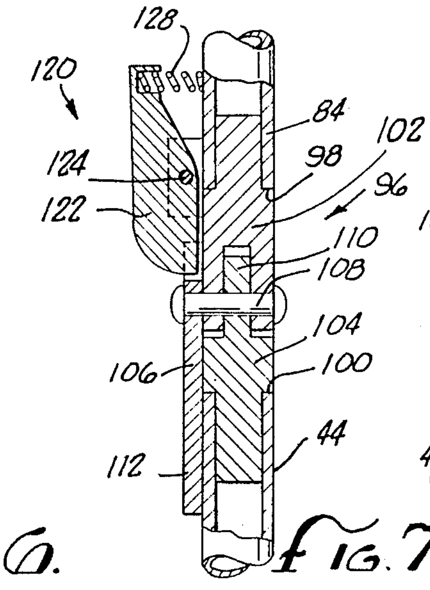
Figure 8:
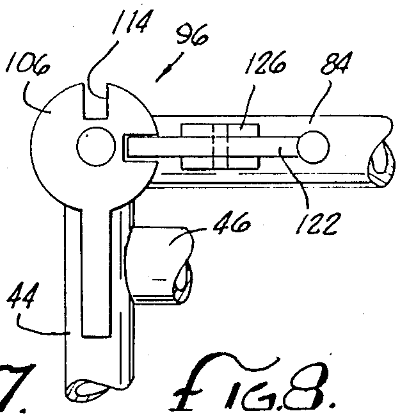

The back frame elements 84 are pivotally mounted to the upper extensions 44 by a pivot means designed 96, see FIGS. 6–8 for details. Each of the members 84 and 44 at respective ends 98 and 100 are fitted with pivot plugs 102 and 104. The plugs 102 and 104 project to each other. The lower plug 104 is fitted with an exterior pivot disc 106 and a pivot pin 108 passes through the disc 106 and plug projection 110 to lock the extensions 44 and back frame elements 84 together. In this way the frame elements 84 can pivot from the upright (FIG. 6) to the horizontal (FIG. 8).

The arm 112 extending from the disc 106 may be welded or otherwise secured to the upper extension 44.

The disc 106 is formed with a pair of locking notches 114 and 116. The notch 114 is provided to assure the back frame 84 remains in an upright position until released. The notch 116 is provided to assure the wheelchair 16 will remain in the folded position of FIG. 5 until released.

In order to lock the wheelchair 16 in the respective open or folded position a locking member 120 is provided. The member 120 includes a locking pawl 122 that is pivotally mounted by pivot pin 124 through mounting ears 126 on the back frame 122. The pawl 122 will engage the notch 114 or 116 to hold the position of FIGS. 4 or 5.

Preferably the locking pawl 122 is spring loaded by means of coil spring 128.

The back frame elements 84 may also be fitted with arm rests 132 that are pivotably affixed thereto.

Additionally, each of the side frames 18 preferably include a link means 134 to unite the back frame elements 84 to the axle plate 64. The link means 134 will allow the plate 64 to slide on the guide rod 48 from a rear or open position to a forward or closed position (FIGS. 4 and 5). The link means 134 include a link bar 136 pivotally connected at ends 138 and 140 to frame 84 and plate 64 respectively.

Figure 2:
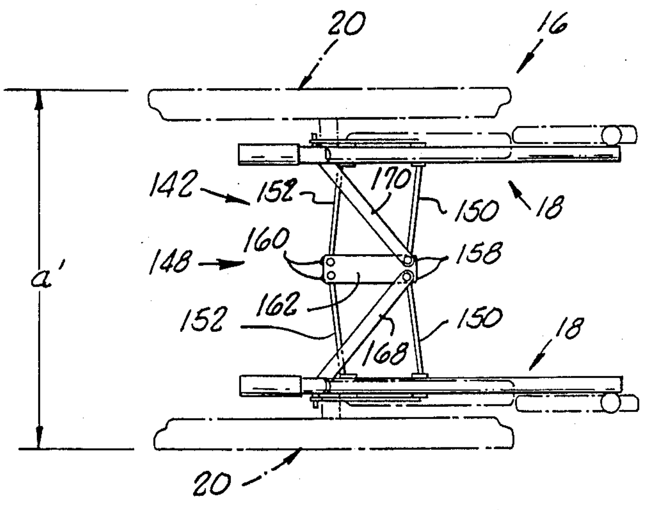
FIG. 2 is a top plan view of a portion of the frame and folding mechanism.

In order to effect an inward folding of one side frame 18 to the other there is provided a folding frame means designated 142. This frame means 142 is best seen in FIGS. 2 and 9.

Interconnecting the side frames 18 for stability and to accomplish a folding of one side frame 18 to the other for storage and transportation of the unit are foldable brace means generally designated 148.

The foldable brace means 148 includes a pair of pivot link arms 150 and 152 projecting from pivot mounts 154 secured on the inside surface 156 of each of the axle plates 64. Each arm 150 and 152 terminates adjacent each other in pivot ends 158 and 160. These pivot ends are secured to a tie bar 162.

Also secured to the tie bar 162 by pivot pins 164 and 166 are tie rods 168 and 170. The rods 168 and 170 each extend to a respective side frame 18 and are pivotably secured to said respective frames 18 to the extension 44 depending from the horizontal guide rod 48, see FIG. 9.

The previously described brace means 148 differs substantially from the conventional cross brace 180 of a conventional wheelchair 182 shown in FIGS. 10–12. In the conventional chairs 182 generally the back frame 184 is fixed and the arm rests 186 are also fixed. Further with feet supports 188 that are fixed to the chair 182 its folding, illustrated in FIG. 12 will reduce the width "a" of the open chair, FIG. 11, to that of width "b" in FIG. 12, however, the overall length c of the chair 182 remains the same. Also the folding of chair 182 will not reduce the overall height "d" of the chair (FIG. 10). Thus, the only reduction in area is the width "a" to width "b" which is some saving of space but placing such a conventional wheelchair 182 in the newer smaller vehicles may pose a real problem.

However, with the present folding wheelchair 16 it can be seen that its folding reduces the conventional length, width and height. In order to fold the chair 16 from its open position and full height represented by arrow "h", FIG. 4, the locking pawl 122 is released from the open locking notch 114 and the handle portions 88 is pivoted forward toward the seat 52 as seen in FIG. 4. At the same time or before unlocking the arms 132 may be pivoted upwardly, see the arrow in FIG. 4 against the back frame elements 84.

As the frame elements 84 pivot downward on pivot 108 the link bars 136 will urge each axle plate 64 to slide forward on the guide rods 48 and bottom horizontal strut 34 from the position in FIG. 4 to that in FIG. 5.

With the sliding of the axle plates 64 the respective wheels 20 move forward and shorten the distance "aa" (FIG. 4 to distance "ab" (FIG. 5). Thus with the back frames fully pivoted to the horizontal (FIG. 5) the frames 18 and casters 30 are all shifted to an overall length and height area approximately equal to the diameter (represented by the arrow "dd" of FIG. 5) of the wheels 20.

Figure 3:
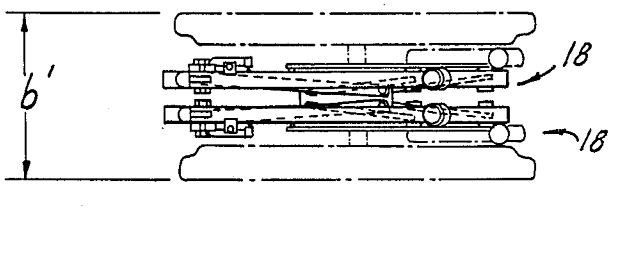
FIG. 3 is a top plan view of the portion of FIG. 2 folded into position within the perimeter of the larger wheels of the chair.

At the same time the axle plates 64 are sliding forward, as the back of the chair 16 is pivoted downwardly, the brace means 148 are activated and simultaneously the respective side frames 18 are drawn together as seen in FIG. 3. This folding or drawing takes place because as the plates 64 slide forward the link arms 150 and 152 pivot with the movement of the plates. At the same time the pivoted tie rods 168 and 170 are also moved by movement of the arms 150 and 152 and the tie bar 162 and the forward movement and pivoting movement of the rods 168 and 170 will cause the frames to move from an open width represented by arrow "a'" to the closed width represented by arrow "b'", see FIG. 3.

When the chair 16 is fully folded the pawl 122 will engage the locking notch 116 as best seen in FIG. 8 and the chair will be retained in the folded position of FIG. 5.

In view of the brace means 148 and linking means 134 the chair 16 will fold to the width "b'", which is normally less than width "b" of a conventional chair 182. Further, if the diameter "dd" of the wheels 20 are the conventional type twenty four inches than the entire wheelchair 16 will be compressed into the same area helping to facilitate the storage of the chair in a relatively small automobile or even transportation in an airplane.

In the preferred embodiment of the present invention no leg or foot rests are illustrated. However, without departing from the spirit of the invention, removable leg or foot rests may be utilized and inserted in openings 192 in the vertical front struts 38.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. I do not wish to be restricted to the specific forms shown or uses mentioned, except as defined in the accompanying claims, wherein various portions have been separated for clarity of reading and not for emphasis.

I claim:

1. In a folding wheelchair that includes a pair of side frames, a pair of casters one mounted on each of said frames at the front portion thereof, a flexible seat extending between said pair of side frames, and a pair of wheels with axles each associated with one of said frames rearwardly of said casters, the improvements comprising:

a back section pivotally mounted to each of said side frames and projecting upwardly from said frames with a flexible back extending between said pair of said frames;

wheel shiftable means having an open position and a closed position slidably mounted on each of said side frames and each means retaining one of said wheels;

foldable brace means extending between said wheel shiftable means having an open and a closed position, tie bar means linked to said brace means and said frames; and linkage means interconnecting said back section and said wheel shiftable means whereby downward pivoting of said back section will simultaneously shift said wheels over said side frames and fold said pair of side frames toward one another to a non-use compact position.

2. In a folding wheelchair as defined in claim 1 wherein there is included:

locking means associated with said back section and at least one of said side frames to releasably retain said wheelchair in an open or compact closed position.

3. In a folding wheelchair as defined in claim 2 wherein said back section includes:

a pair of pivotable arm rests projecting therefrom.

4. In a folding wheelchair as defined in claim 1 wherein said wheel shiftable means includes:

an axle plate slidably mounted on each of said side frames from a rear open to a foreward closed position;

said wheels each having axles which are secured to said axle plate and capable of being shifted from said rear open to said forward closed position.

5. In a folding wheelchair as defined in claim 1 wherein said foldable brace means includes:

pivotable link arms extending inwardly from each of said side frames to a tie bar and being simultaneously pivotable with the sliding of said wheel shiftable means, and pivotable tie rods extending between said tie bar and each of said side frames, whereby activation of said link arms will draw said side frames toward each other to assume a folded non-use position.

6. In a folding wheelchair as defined in claim 1 wherein said linkage means includes a link bar extending between said back section and said wheel shiftable means whereby the downward pivoting of said back will correlate with and simultaneously slide said shiftable means.

7. In a folding wheelchair as defined in claim 2 wherein said locking means include:

a pivot disc fixedly secured to at least one of said side frames at the junction of said side frame and said back section, said disc including a pair of locking notches one to retain said chair in an open usable position and a second notch to retain said chair in a closed non-usable position; and a locking pawl on said back section adapted to engage one of said notches dependent upon the position of said back section relative to said side frame.

8. In a folding wheelchair as defined in claim 7 where there are locking means on each side frame.

9. In a folding wheelchair as defined in claim 4 wherein said axle plate includes:

a plurality of adjustment axle holes therethrough adapted to receive said axles to shift the height and center of gravity of said wheelchair dependent upon the person to use said chair.

10. In a folding wheelchair as defined in claim 1 wherein said back section includes:

handle portions bent normal to the plain of said back section on each of said side frames; and hand grips secured on said handle portions.

11. A folding wheelchair comprising:

a pair of tubular side frames having a front and rear portion;

a pair of casters one mounted on each of said frames at said front portion thereof;

a flexible seat extending between said pair of side frames;

a pair of wheels having axles one associated with each of said frames rearwardly of said casters;

a back section pivotally mounted to each of said frames and projecting upwardly from said frames with a flexible back extending between said pair of frames;

wheel shiftable means having an open position and a closed position slidably mounted on each of said side frames and each means retaining one of said wheels;

foldable brace means extending between said wheel shiftable means having an open and closed position, tie bar means linked to said brace means and said frames; and linkage means interconnecting said back section and said wheel shiftable means whereby with downward pivoting of said back section toward said seat will simultaneously shift said wheels over said side frames and fold said pair of said frames toward one another to a non-use compact position.

12. A folding wheelchair as defined in claim 11 wherein there is included:

locking means associated with said back section and at least one of said side frames to releasably retain said wheelchair in one an open or compact closed position.

* * * * *